(12) United States Patent
Foladare et al.

(10) Patent No.: US 6,249,815 B1
(45) Date of Patent: Jun. 19, 2001

(54) METHOD AND APPARATUS FOR BUILDING SUBSCRIBER SERVICE PROFILE BASED ON SUBSCRIBER RELATED DATA

(75) Inventors: Mark Jeffrey Foladare, Kendall Park; Shelley B. Goldman, East Brunswick; Peter Kapsales, Holmdel, all of NJ (US)

(73) Assignee: AT&T Corp., New York, NY (US)

( * ) Notice: Subject to any disclaimer, the term of this patent is extended or adjusted under 35 U.S.C. 154(b) by 0 days.

(21) Appl. No.: 09/072,786

(22) Filed: May 6, 1998

(51) Int. Cl.[7] .................................................. G06F 15/173
(52) U.S. Cl. ........................... 709/223; 709/203; 713/202
(58) Field of Search ..................................... 713/200–202; 709/200–203, 223–225, 238, 239, 246; 705/7, 10, 14

(56) References Cited

U.S. PATENT DOCUMENTS

| | | | | |
|---|---|---|---|---|
| 5,897,616 | * | 4/1999 | Kanevsky et al. | 704/246 |
| 5,930,804 | * | 7/1999 | Yu et al. | 707/104 |
| 5,931,907 | * | 8/1999 | Davies et al. | 709/218 |
| 5,940,843 | * | 8/1999 | Zucknovich et al. | 707/516 |
| 5,991,735 | * | 11/1999 | Gerace | 705/10 |
| 6,012,046 | * | 1/2000 | Lupien et al. | 705/37 |
| 6,018,619 | * | 1/2000 | Allard et al. | 395/200.54 |
| 6,041,311 | * | 3/2000 | Chislenko et al. | 705/27 |
| 6,081,840 | * | 6/2000 | Zhao | 709/224 |
| 6,092,049 | * | 7/2000 | Chislenko et al. | 705/10 |
| 6,112,186 | * | 8/2000 | Bergh et al. | 705/10 |

\* cited by examiner

Primary Examiner—Wayne Amsbury
Assistant Examiner—Mary Wang

(57) ABSTRACT

A service optimizer establishes an initial subscriber profile relating to a subscriber upon subscribing to a service. The service optimizer uses service data within the subscriber profile to administer a service for the subscriber. The initial subscriber profile contains personal and service information particular to the subscriber. The service optimizer analyzes the personal and service information in the subscriber profile to alter the service data used by the service optimizer to more efficiently administer the service. Additionally, the service optimizer analyzes information indicating how the subscriber uses the service to alter the service data used by the service optimizer to more efficiently administer the service.

18 Claims, 15 Drawing Sheets

FIG. 5

SUBSCRIBER PERSONAL DATA

SUBSCRIBER ID

SECURITY DATA:
PASSWORD [*******]

BILLING INFORMATION:
ADDRESS: [111 BILLING AVE. SUBSCRIPTION CITY, N.J.
DIRECT DEBIT: BANK[##########]
CHECKING ACCOUNT [##########]
BILLING PERIOD: [1 MONTH]

PERSONAL SCHEDULE

OCCUPATION: [MANAGER/SCIENTIST]
BUSINESS TRAVEL: [TWO TRIPS PER MONTH]

HOBBIES: GOLF (1) TENNIS (2) BOATING (3) RUNNING (4): [1,4]
FREQUENCY: [1 EVERY SATURDAY AM] [4 LUNCH MONDAY-FRIDAY]

FAMILY:
1. [SPOUCE (OCCUPATION PHYSICIAN)]
2. TWO CHILDREN: FEMALE (BORN 1980)
              MALE (BORN 1991)

PREFERENCES:
1. PERFORM OPTIMIZATION EVERY [6] BILLING PERIODS
2. ALTERATIONS:
AUTOMATIC: [NO INCREASE IN SUBSCRIPTION COST]
WITH APPROVAL: [INCR. IN SUBSCRIPTION COST<$50 PER
               BILLING PERIOD]

FIG. 6

PERSONAL SCHEDULE
SUBSCRIBER ID

| TIME | SUNDAY | MONDAY | TUESDAY | WEDNESDAY | THURSDAY | FRIDAY | SATURDAY |
|---|---|---|---|---|---|---|---|
| 6:00 AM | | | | | | | |
| 7:00 AM | | COMMUTE | COMMUTE | COMMUTE | COMMUTE | COMMUTE | GOLF |
| 8:00 AM | | OFFICE | OFFICE | OFFICE | OFFICE | OFFICE | GOLF |
| 9:00 AM | RELIGIOUS SERVICE | OFFICE | OFFICE | OUT OF OFFICE; STAFF MEETING | OFFICE | OFFICE | GOLF |
| 10:00 AM | | OFFICE | OFFICE | OUT OF OFFICE; STAFF MEETING | OFFICE | OFFICE | GOLF |
| 11:00 AM | | OFFICE | OFFICE | OFFICE | OFFICE | OFFICE | GOLF |
| 12:00 PM | | RUNNING | RUNNING | RUNNING | RUNNING | RUNNING | |
| 1:00 PM | | OFFICE | OFFICE | OFFICE | OFFICE | OFFICE | |
| 2:00 PM | | OFFICE | OFFICE | OFFICE | OFFICE | OFFICE | |
| 3:00 PM | | OFFICE | OFFICE | OFFICE | OFFICE | OFFICE | |
| 4:00 PM | | OFFICE | OFFICE | OFFICE | OFFICE | OFFICE | |
| 5:00 PM | | OFFICE | OFFICE | OFFICE | OFFICE | OFFICE | |
| 6:00 PM | | COMMUTE | COMMUTE | COMMUTE | COMMUTE | COMMUTE | |
| 7:00 PM | | COMMUTE | COMMUTE | COMMUTE | COMMUTE | COMMUTE | |
| 8:00 PM | | HOME | HOME | HOME | HOME | HOME | |
| 9:00 PM | | HOME | HOME | HOME | HOME | HOME | |

SUBSCRIBER SERVICE DATA (70)

1. TERMINAL 1:
    DEVICE TYPE (LAND LINE PHONE)
    TELEPHONE NO. ######
    LOCATION: HOME
    SERVICES: CALL FORWARDING, VOICE MAIL

2. TERMINAL 2:
    DEVICE TYPE (LAND LINE PHONE)
    TELEPHONE NO. ######
    LOCATION: OFFICE
    SERVICES: CALL FORWARDING, VOICE MAIL, PAGING

3. TERMINAL 3:
    DEVICE TYPE (CELLULAR PHONE)
    TELEPHONE NO. ######
    MIN. #########
    SERVICES: CALL FORWARDING, VOICE MAIL

[SERVICE SCHEDULE (71)]

4. TERMINAL 4:
    DEVICE TYPE (PAGER)
    CAP CODE NO. ######
    PAGER ACCESS #####

5. TERMINAL 5:
    DEVICE TYPE (PERSONAL COMPUTER)
    E-MAIL ADDRESS

FIG. 8

SERVICE SCHEDULE IN SERVICE DATA 70 — 71

| SUBSCRIBER ID | | | | | | | |
|---|---|---|---|---|---|---|---|
| TIME | SUNDAY | MONDAY | TUESDAY | WEDNESDAY | THURSDAY | FRIDAY | SATURDAY |
| 6:00 AM | | | | | | | |
| 7:00 AM | | HOME AND OFFICE CALLS TO CELL AFTER 2 RINGS, TO RESPECT VM AFTER 4 RINGS | HOME AND OFFICE CALLS TO CELL AFTER 2 RINGS, TO RESPECT VM AFTER 4 RINGS | HOME AND OFFICE CALLS TO CELL AFTER 2 RINGS, TO RESPECT VM AFTER 4 RINGS | HOME AND OFFICE CALLS TO CELL AFTER 2 RINGS, TO RESPECT VM AFTER 4 RINGS | HOME AND OFFICE CALLS TO CELL AFTER 2 RINGS, TO RESPECT VM AFTER 4 RINGS | |
| 8:00 AM | | ALL OFFICE AND CELLULAR CALLS TO HOME AFTER 2 RINGS; THEN OFFICE CALLS TO OFFICE VM AND CELL CALLS TO HOME VM AFTER 4 RINGS HOME CALLS TO VM AFTER 3 RINGS | ALL OFFICE AND CELLULAR CALLS TO HOME AFTER 2 RINGS; THEN OFFICE CALLS TO OFFICE VM AND CELL CALLS TO HOME VM AFTER 4 RINGS HOME CALLS TO VM AFTER 3 RINGS | ALL OFFICE AND CELLULAR CALLS TO HOME AFTER 2 RINGS; THEN OFFICE CALLS TO OFFICE VM AND CELL CALLS TO HOME VM AFTER 4 RINGS HOME CALLS TO VM AFTER 3 RINGS | ALL OFFICE AND CELLULAR CALLS TO HOME AFTER 2 RINGS; THEN OFFICE CALLS TO OFFICE VM AND CELL CALLS TO HOME VM AFTER 4 RINGS HOME CALLS TO VM AFTER 3 RINGS | ALL OFFICE AND CELLULAR CALLS TO HOME AFTER 2 RINGS; THEN OFFICE CALLS TO OFFICE VM AND CELL CALLS TO HOME VM AFTER 4 RINGS HOME CALLS TO VM AFTER 3 RINGS | |
| 9:00 AM | | | | | | | |
| 10:00 AM | | | | | | | |
| 11:00 AM | | | | | | | |
| 12:00 PM | | | | | | | |
| 1:00 PM | | | | | | | |
| 2:00 PM | | | | | | | |
| 3:00 PM | | | | | | | |
| 4:00 PM | | | | | | | |
| 5:00 PM | | | | | | | |
| 6:00 PM | | HOME AND OFFICE CALLS TO CELL AFTER 2 RINGS, TO RESPECT VM AFTER 4 RINGS | HOME AND OFFICE CALLS TO CELL AFTER 2 RINGS, TO RESPECT VM AFTER 4 RINGS | HOME AND OFFICE CALLS TO CELL AFTER 2 RINGS, TO RESPECT VM AFTER 4 RINGS | HOME AND OFFICE CALLS TO CELL AFTER 2 RINGS, TO RESPECT VM AFTER 4 RINGS | HOME AND OFFICE CALLS TO CELL AFTER 2 RINGS, TO RESPECT VM AFTER 4 RINGS | |
| 7:00 PM | | | | | | | |
| 8:00 PM | | HOME CALLS TO OFFICE AFTER 2 RINGS, TO HOME VM AFTER 4 RINGS; OFFICE CALLS TO VM AFTER 3 RINGS | HOME CALLS TO OFFICE AFTER 2 RINGS, TO HOME VM AFTER 4 RINGS; OFFICE CALLS TO VM AFTER 3 RINGS | HOME CALLS TO OFFICE AFTER 2 RINGS, TO HOME VM AFTER 4 RINGS; OFFICE CALLS TO VM AFTER 3 RINGS | HOME CALLS TO OFFICE AFTER 2 RINGS, TO HOME VM AFTER 4 RINGS; OFFICE CALLS TO VM AFTER 3 RINGS | HOME CALLS TO OFFICE AFTER 2 RINGS, TO HOME VM AFTER 4 RINGS; OFFICE CALLS TO VM AFTER 3 RINGS | |
| 9:00 PM | | | | | | | |

FIG. 9

ALTERNATIVE SERVICE SCHEDULE AS ALTERNATIVE SERVICE DATA 75

SUBSCRIBER ID

| TIME | SUNDAY | MONDAY | TUESDAY | WEDNESDAY | THURSDAY | FRIDAY | SATURDAY |
|---|---|---|---|---|---|---|---|
| 6:00 AM |  |  |  |  |  |  |  |
| 7:00 AM |  | HOME AND OFFICE CALLS TO CELL AFTER 2 RINGS, TO RESPECT VM AFTER 4 RINGS | HOME AND OFFICE CALLS TO CELL AFTER 2 RINGS, TO RESPECT VM AFTER 4 RINGS | HOME AND OFFICE CALLS TO CELL AFTER 2 RINGS, TO RESPECT VM AFTER 4 RINGS | HOME AND OFFICE CALLS TO CELL AFTER 2 RINGS, TO RESPECT VM AFTER 4 RINGS | HOME AND OFFICE CALLS TO CELL AFTER 2 RINGS, TO RESPECT VM AFTER 4 RINGS |  |
| 8:00 AM |  | HOME CALLS TO OFFICE AFTER 2 RINGS, TO HOME VM AFTER 4 RINGS; OFFICE CALLS TO VM AFTER 3 RINGS | HOME CALLS TO OFFICE AFTER 2 RINGS, TO HOME VM AFTER 4 RINGS; OFFICE CALLS TO VM AFTER 3 RINGS | HOME CALLS TO OFFICE AFTER 2 RINGS, TO HOME VM AFTER 4 RINGS; OFFICE CALLS TO VM AFTER 3 RINGS | HOME CALLS TO OFFICE AFTER 2 RINGS, TO HOME VM AFTER 4 RINGS; OFFICE CALLS TO VM AFTER 3 RINGS | HOME CALLS TO OFFICE AFTER 2 RINGS, TO HOME VM AFTER 4 RINGS; OFFICE CALLS TO VM AFTER 3 RINGS |  |
| 9:00 AM |  |  |  |  |  |  |  |
| 10:00 AM |  |  |  |  |  |  |  |
| 11:00 AM |  |  |  |  |  |  |  |
| 12:00 PM |  |  |  |  |  |  |  |
| 1:00 PM |  |  |  |  |  |  |  |
| 2:00 PM |  |  |  |  |  |  |  |
| 3:00 PM |  |  |  |  |  |  |  |
| 4:00 PM |  |  |  |  |  |  |  |
| 5:00 PM |  |  |  |  |  |  |  |
| 6:00 PM |  | HOME AND OFFICE CALLS TO CELL AFTER 2 RINGS, TO RESPECT VM AFTER 4 RINGS | HOME AND OFFICE CALLS TO CELL AFTER 2 RINGS, TO RESPECT VM AFTER 4 RINGS | HOME AND OFFICE CALLS TO CELL AFTER 2 RINGS, TO RESPECT VM AFTER 4 RINGS | HOME AND OFFICE CALLS TO CELL AFTER 2 RINGS, TO RESPECT VM AFTER 4 RINGS | HOME AND OFFICE CALLS TO CELL AFTER 2 RINGS, TO RESPECT VM AFTER 4 RINGS |  |
| 7:00 PM |  |  |  |  |  |  |  |
| 8:00 PM |  | ALL OFFICE AND CELLULAR CALLS TO HOME AFTER 2 RINGS; THEN OFFICE CALLS TO OFFICE VM AND CELL CALLS TO HOME VM AFTER 4 RINGS HOME CALLS TO VM AFTER 3 RINGS | ALL OFFICE AND CELLULAR CALLS TO HOME AFTER 2 RINGS; THEN OFFICE CALLS TO OFFICE VM AND CELL CALLS TO HOME VM AFTER 4 RINGS HOME CALLS TO VM AFTER 3 RINGS | ALL OFFICE AND CELLULAR CALLS TO HOME AFTER 2 RINGS; THEN OFFICE CALLS TO OFFICE VM AND CELL CALLS TO HOME VM AFTER 4 RINGS HOME CALLS TO VM AFTER 3 RINGS | ALL OFFICE AND CELLULAR CALLS TO HOME AFTER 2 RINGS; THEN OFFICE CALLS TO OFFICE VM AND CELL CALLS TO HOME VM AFTER 4 RINGS HOME CALLS TO VM AFTER 3 RINGS | ALL OFFICE AND CELLULAR CALLS TO HOME AFTER 2 RINGS; THEN OFFICE CALLS TO OFFICE VM AND CELL CALLS TO HOME VM AFTER 4 RINGS HOME CALLS TO VM AFTER 3 RINGS |  |
| 9:00 PM |  |  |  |  |  |  |  |

FIG. 10

| ALT900 | IF (AT LOCATION) THEN (ACCESS SERVICE DATA 70 TO DETERMINE IF TERMINAL AT LOCATION) |
|---|---|
| ALT910 | IF (TERMINAL AT LOCATION) THEN (DESIGN ALTERNATIVE SERVICE SCHEDULE IN ALTERNATIVE SERVICE DATA 75 INCLUDING [CALLS RECEIVED AT TERMINALS [NOT LOCATION] ROUTE TO TERMINAL]) |
| ALT1000 | IF (REGULARLY AWAY FROM OFFICE) THEN (ACCESS SERVICE DATA TO DETERMINE EXISTENCE OF CELL PHONE OR PAGER TERMINALS) |
| ALT1010 | IF (CELL PHONE AND PAGER TERMINALS EXIT) THEN (ACCESS PERSONAL DATA TO DETERMINE CELL PHONE AND PAGER PREFERENCE) |
| ALT1020 | IF (PREFERENCE TERMINAL EXISTS) THEN (SWITCH TO PREFERRED TERMINAL) |
| ALT2000 | IF (PERCENTAGE OF CALLS ANSWERED>.90) THEN (NO CALL ROUTING ALTERATION) |
| ALT2010 | IF ([NUMBER OF CALLS ANSWERED IN TWO RINGS/NUMBER OF CALLS RECEIVED]<.95) THEN (PERFORM ALT 2020) ELSE (NO CALL ROUTING ALTERATION) |
| ALT2020 | IF ([NUMBER OF CALLS ANSWERED IN THREE RINGS/NUMBER OF CALLS RECEIVED]<.90) THEN (PERFORM ALT 2030) ELSE (NO CALL ROUTING ALTERATION) |
| ALT2030 | IF ([NUMBER OF CALLS ANSWERED IN FOUR RINGS/NUMBER OF CALLS RECEIVED]<.90) THEN (ACCESS PERSONAL DATA) |
| ALT2040 | IF ([PERCENTAGE DATA<.3) THEN (NO ALTERATION) |

ALTERATION-RULES 730

| SUBSCRIBER USE DATA ||
|---|---|
| SUBSCRIBER ID | ANALYSIS PERIOD |
| DATA TYPE | PERCENTAGE |
| % TOTAL CALLS COMPLETED TO CALLS RECEIVED | 47% |
| % HOME CALLS COMPLETED TO CALLS RECEIVED | 32% |
| % OFFICE CALLS COMPLETED TO CALLS RECEIVED | 55% |
| % CELL CALLS COMPLETED TO CALLS RECEIVED | 67% |
| % HOME CALLS COMPLETED BETWEEN 7:00 AND 9:00 PM | 20% |
| % VOICE MAIL RECEIVED FROM CELL PHONE BETWEEN 7:00 AND 9:00 | 70% |
| % TOTAL CALLS COMPLETED WITHOUT ROUTING | 23% |
| % TOTAL CALLS COMPLETED WITH ONE ROUTING | 38% |
| % TOTAL CALLS COMPLETED WITH TWO ROUTINGS | 69% |
| % TOTAL CALLS COMPLETED WITH THREE ROUTINGS | 87% |

FIG. 13

TRANSACTIONAL DATA 40

| CALL | DATE | RECEIPT TIME | ACTION PERFORMED | COMPLETE TIME | TIME TO COMPLETE RECEIVED CALL | NUMBER OF ROUTINGS PERFORMED | ANI OF CALLING PARTY | RESULT PERFORMED |
|---|---|---|---|---|---|---|---|---|
| 001111 | 3/15/98 | OFFICE 08:55:23 | ROUTE TO CELL PHONE | 08:56:53 | 1:30 | 2 | 432467987 | COMPLETED |
| 001112 | 3/15/98 | HOME 09:30:15 | ROUTE TO OFFICE; ROUTE TO HOME VOICE MAIL | N/A | N/A | 2 | 214212112 | NO MESSAGE LEFT ON VOICE MAIL |
| 001113 | 3/15/98 | HOME VOICE MAIL 10:55:22 | HOME VOICE MAIL ACCESSED | N/A | N/A | N/A | 080980808 | SUBSCRIBER ACCESSED HOME VOICE MAIL FROM REMOTE ANI |
| 001114 | 3/15/98 | OFFICE 12:05:03 | ROUTE TO OFFICE VOICE MAIL AFTER THREE RINGS | N/A | N/A | 0 | 947389278 | OFFICE VOICE MAIL MESSAGE RECEIVED |
| 001115 | 3/15/98 | HOME 18:55:47 | ROUTE TO CELL PHONE AFTER TWO RINGS; ROUTE TO HOME VOICE MAIL AFTER FOUR RINGS | 18:57:23 | 1:36 | 2 | 908404803 | HOME VOICE MAIL MESSAGE RECEIVED |
| 001116 | 3/15/98 | HOME VOICE MAIL 10:55:22 | HOME VOICE MAIL ACCESSED | N/A | N/A | N/A | 080980808 | SUBSCRIBER ACCESSED HOME VOICE MAIL FROM REMOTE ANI |

FIG. 15

SERVICE ALTERATION     15

USE DATA INDICATES 5% OF CALLS RECEIVED AT [OFFICE] BETWEEN 12:00 AND 1:00 PM

PERSONAL DATA INDICATES THAT [SUBSCRIBER ID]:
1. HAS A [CELLULAR PHONE]
2. ENGAGES IN [RUNNING] FROM [12:00 PM] TO [1:00 PM] ON [MONDAY, TUESDAY, WEDNESDAY, THURSDAY AND FRIDAY]

QUERY: WOULD SUBSCRIBER [ID] LIKE CALLS ROUTED TO [CELLULAR PHONE ANI ########] BETWEEN 12:00 AND 1:00 PM ON MONDAY, TUESDAY, WEDNESDAY, THURSDAY FRIDAY ?

METHOD AND APPARATUS FOR BUILDING SUBSCRIBER SERVICE PROFILE BASED ON SUBSCRIBER RELATED DATA

BACKGROUND OF THE INVENTION

1. Field of Invention

The present invention relates to improving the efficiency of a service system by formulating an optimized subscriber profile based on data related to an individual subscriber.

2. Description of Related Art

Service systems are becoming increasingly complex and varied in the types of services they provide. New technology is providing more different types of services to subscribers along with options regarding how these services are implemented. With these increasingly complex service systems, subscribers are often bewildered by the number of services and the number of ways these services may be combined. For example, call routing, paging and voice-mail services in a communication system may be set up many different ways. Ideally, the services should be set up to work together to provide the most efficient service to a subscriber to maximize the likelihood of call completion without unnecessary hold times for the caller. However, a subscriber must expend a significant amount of time to achieve such efficiency in addition to becoming knowledgeable about a service system and evaluating the subscriber's own use of these services.

Moreover, the number of services available to the subscriber is increasing, thus compounding the difficulty for the subscriber to determine how best to use all available services. Accordingly, new technology is needed to assist the subscriber to efficiently use the services.

SUMMARY OF THE INVENTION

The present invention provides a service optimizer for improving a subscriber's efficiency in using a service system such as, for example, a communication system or an information accessing system. The service optimizer alters a subscriber profile used to provide the services to improve the subscriber's efficient use of the service system.

The service optimizer analyzes data contained in the subscriber profile to identify how the subscriber may use the service system more efficiently and whether new services may be used. The subscriber profile contains personal data, service data and use data particular to the subscriber. The personal data includes, for example, the subscriber's occupation, family information, and billing information. The service data includes information indicating which services the subscriber has subscribed to and how these services are set up to work. The use data includes information indicating how the subscriber is using the services.

The service optimizer optimizes the subscriber's use of the service system by analyzing the subscriber profile to recommend/automatically implement different services and options on how those services are set up.

BRIEF DESCRIPTION OF THE DRAWINGS

The invention will be described with reference to the accompanying drawings, in which like elements are designated by like numbers and in which:

FIG. 5 illustrates an example of subscriber personal data used by the service optimizer;

FIG. 6 illustrates an example of a personal schedule included in the subscriber personal data used by the service optimizer;

FIG. 7 illustrates an example of subscriber service data used by the service optimizer;

FIG. 8 illustrates an example of a subscriber service schedule included in the subscriber service data used by the service optimizer;

FIG. 9 illustrates an example of an alternative subscriber service schedule included in the alternative subscriber service data produced by the service optimizer;

FIG. 10 illustrates examples of alteration-rules used by the service optimizer;

FIG. 12 illustrates an example of subscriber use data used by the service optimizer;

FIG. 13 illustrates an example of transactional data used by the service optimizer;

FIG. 15 is an example of a suggested service alteration provided in a third embodiment;

DETAILED DESCRIPTION OF PREFERRED EMBODIMENTS

Complex service systems with multiple options of service are becoming more prevalent in society. For example, a communication system may provide land-line and cellular telephone access, telephone call routing, paging, voice-mail and follow-me services. Communication services such as paging and call forwarding are meant to improve the likelihood of a called party receiving telephone calls. However, due to the increasing number of services and different ways the services may be combined to work together, identifying the most efficient way to use the communication services is difficult. A subscriber needs to understand how routing and voice-mail services work in combination in order to evaluate whether the way these services are used is most efficient, e.g., the implementation is the most efficient manner to receive telephone calls while minimizing wait time for a calling party.

When applied to a communication system, the present invention provides a service optimizer for improving a subscriber's efficiency in using the communication system (service system) to maximize the likelihood of call completion without unnecessary hold times for a calling party. The service optimizer analyzes data contained in a subscriber profile to identify how the subscriber may use the services provided by the service system more efficiently and, optionally, alters a subscriber's service data to improve the subscriber's efficiency.

Figure 1:
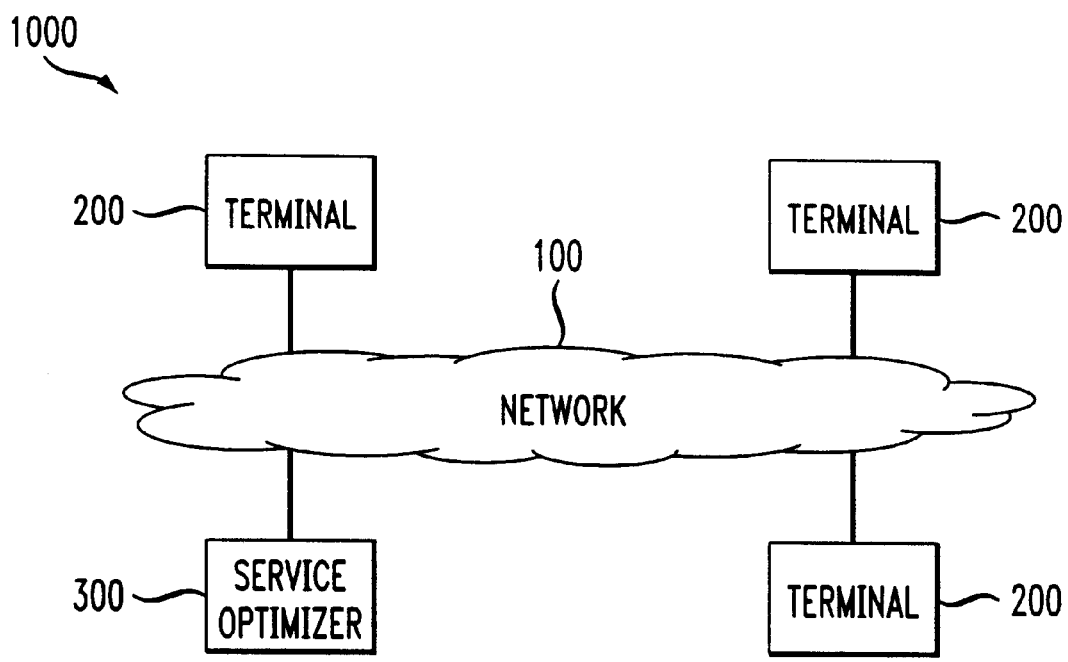
FIG. 1 illustrates a service system incorporating a service optimizer.

As shown in FIG. 1, a service system 1000 is comprised of a network 100, a number of terminals 200 and a subscriber optimizer 300. If the service system 1000 is a communication system, the network 100 comprises, for example, dedicated telephone lines, switches, local exchange carriers, etc., necessary to provide communication service between terminals 200. The terminals 200 may be, for example, land-line telephones, cellular telephones, pagers, modems, etc.

Although FIG. 1, shows the service optimizer 300 as centrally located, the service optimizer 300 could alternatively be distributed throughout the network 100. Subscribers utilize services provided by the service system 1000 using the network 100 via the terminals 200.

Figure 2:
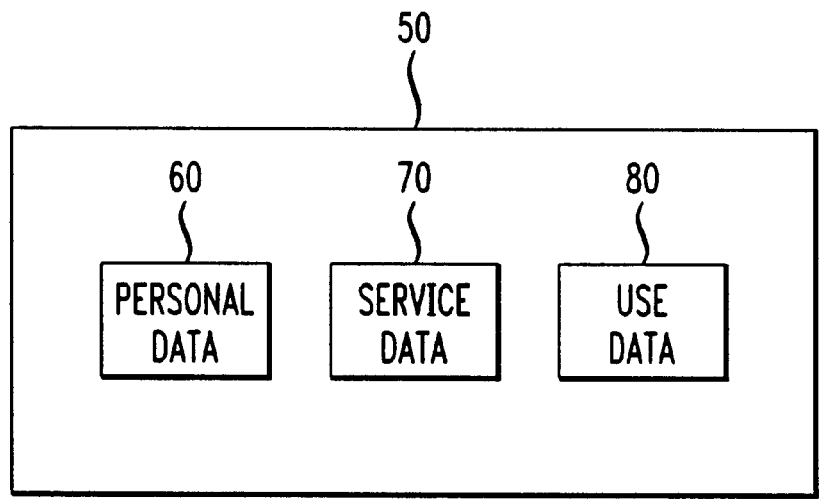
FIG. 2 illustrates an example format for the subscriber profile utilized by the service optimizer.

FIG. 2 shows a subscriber profile 50 that includes subscriber personal data 60, subscriber service data 70 and subscriber use data 80. The subscriber profile 50 is explained using a simple communication system example described below. The provided example does not limit the invention because the service optimizer may be used in conjunction with more complex service systems and systems other than the communication system as discussed herein.

Figure 3:
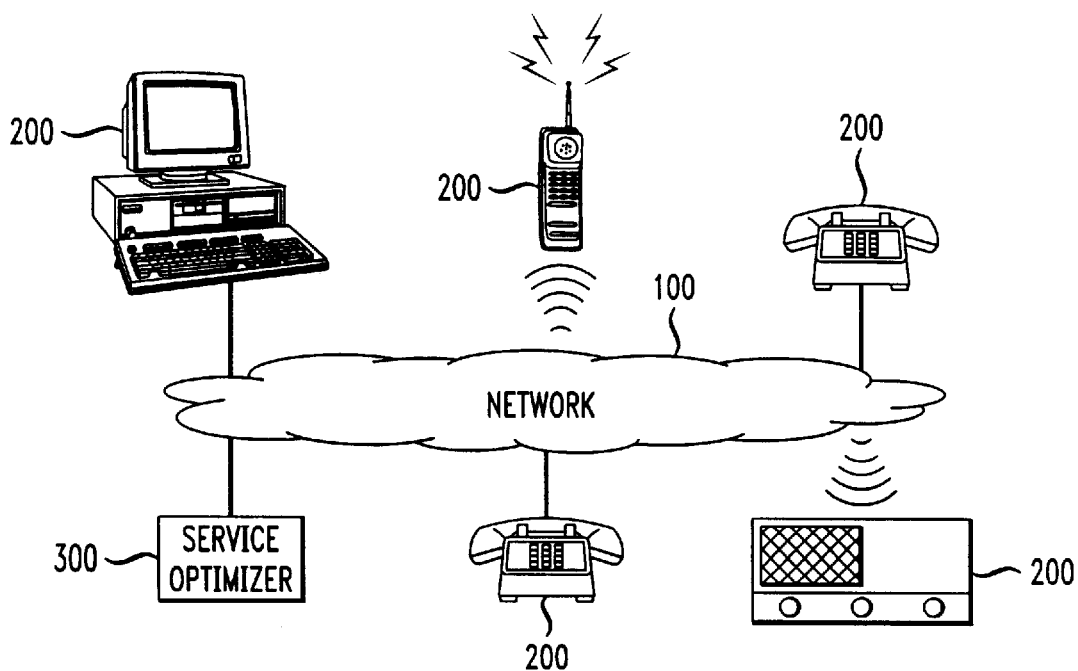
FIG. 3 illustrates a communication service system utilizing the service optimizer.

In the illustrative example, a subscriber to the communication system requests call routing, paging and voice-mail services and requests how these services work in combination with each other to route calls between an office, a home and a cellular telephone number. As illustrated in FIG. 3, the terminals 200 could be, for example, a land-line based office telephone, a land-line based home telephone, and a cellular telephone. The terminals 200 may also include a personal computer, a paging device, etc. The network 100 connects these terminals and allows the subscriber to use the services, e.g., call forwarding, routing, call-waiting, follow-me service, etc. The service optimizer 300 administers and controls how the services route telephone calls in the network 100.

Figure 4:
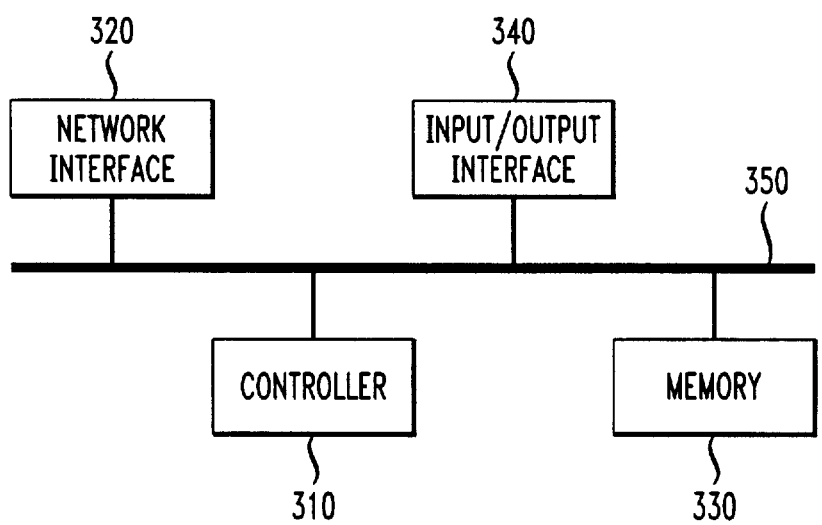
FIG. 4 illustrates a service optimizer according to a first embodiment.

In a first embodiment, the service optimizer 300 includes a controller 310, a network interface 320, a memory 330 and an input/output interface 340 as shown in FIG. 4. The above components are coupled together through the bus 350. The controller 310 may be implemented by a general or special purpose processor such as a CPU. The service optimizer 300 may receive the information through the network interface 320 from the subscriber using a terminal 200 (e.g., a telephone or personal computer, connected to the network 100 or through the input/output interface 340).

The controller 310 of the service optimizer 300 controls/administers the communication services. The subscriber uses the services by interacting with the controller 310 through the network 100 and a terminal 200. The controller 310 administers the communication services in accordance with the subscriber service data 70 which is part of the subscriber profile 50 stored in a database in the memory 330.

FIG. 5 illustrates the subscriber personal data 60. The subscriber personal data 60 contain, for example, the subscriber's address, billing information, a personal schedule 61, the subscriber's occupation, hobbies, family, frequency of business trips, or any other information associated with the subscriber that a system administration would consider useful.

The personal data 60 also contain preferences as to how and when data is analyzed by the service optimizer 300. For example, the personal data 60 may indicate that the controller 310 should automatically implement service alterations. Alternatively, the personal data may indicate that the controller 310 should implement alterations only after approval from the subscriber. Further, the personal data may indicate that the controller 310 should not suggest or implement service alterations which would increase the subscriber's subscription fee by a specified amount. Additionally, it is foreseeable that subscribers may differ on their preferences of how often the service optimizer evaluates the subscriber profile 50. Therefore, the personal data 60 preference section illustrated in FIG. 5 may contain data indicating the preferred duration of time over which the subscriber's use of the system is analyzed.

The preference section may also contain information limiting the service optimizer to formulating and/or suggesting service alterations which would involve subscribing to new services. Also, the personal data 60 may contain information specifying which new services the subscriber wishes to not be considered.

FIG. 6 illustrates a subscriber personal schedule 61 contained in the personal data. The personal schedule 61 includes information about the subscriber's activities and location throughout a full week, for example.

FIG. 7 illustrates subscriber service data 70 in detail. The subscriber service data 70 contain information indicating the services which the subscriber has subscribed to and how each of the services operate. For example, the subscriber service data 70 indicate that the subscriber has a home telephone (10), an office telephone (2) and a cellular telephone (3). The specific entries describing these terminals 200 indicate that each of these terminals 200 has call forwarding and voice mail. The subscriber schedule 71, explained below in detail, indicates how call forwarding and voice mail are implemented (i.e., to what devices the calls are routed, during what time periods and how many rings sound at a telephone before the call is routed). Therefore, the subscriber service data 70 defines how telephone calls are delivered to the subscriber via the network 100 using the services to which the subscriber has subscribed.

The service optimizer 300 analyzes data stored in the subscriber's profile 50 to provide alterations in the subscriber's service data 70 to improve the subscriber's efficiency in using the communication system 2000. That is, the service data 70 may be altered under the guidance of the service optimizer 300 to improve the likelihood of a subscriber receiving telephone calls in the fastest possible manner. Additionally, the service optimizer 300 enables subscribers to take advantage of a large array of communication services because the service optimizer 300 is able to analyze which services would be particularly attractive or beneficial to a subscriber to maximize the likelihood of call completion without unnecessary hold times for the caller.

Further, by using the service optimizer 300, the subscriber is liberated from the task of becoming familiar with all the services provided by the system to determine which services and what set up would improve efficiency. This is particularly advantageous considering that a subscriber may not fully appreciate the utility of specific services if the subscriber is inexperienced in using the communication services.

According to a first embodiment of the invention, the service optimizer 300 alters the subscriber's service data 70 based on analysis of the personal data stored in the subscriber personal data 60.

FIG. 8 illustrates a service schedule 71 contained in the subscriber service data 70. The service schedule 71 dictates where and how calls received at the subscriber's home, office and cellular telephone numbers are routed. For example, between the hours of 8:00 am and 6:00 pm on weekdays, all calls received at the office telephone number and cellular telephone number are routed to the home telephone number after two rings. Subsequently, if the call is not completed at the home telephone number, the calls are routed to voice-mail for the originating terminal (i.e., calls originally received at the office are routed to office voice-mail and calls originally received at the cellular phone are routed to the cellular phone voice-mail).

The controller 310 analyzes the subscriber's personal data 60, illustrated in FIG. 5, and formulates an alternative service schedule contained in an alternative subscriber service data 75, illustrated in FIG. 9, based on the controller's interpretation of the subscriber personal data 60 using condition-action rules called alteration-rules 730 stored in memory 330. As illustrated in FIG. 10, these alteration-rules 730 are tools used to analyze the subscriber profile data.

As an illustrative example, the subscriber's personal schedule shown in FIG. 6 indicates that the subscriber is at the office between 8:00 am and 6:00 pm. However, the service schedule illustrated in FIG. 8 routes all calls received at the office and on the cellular phone to the home telephone number after two rings. Following access of the personal data 60, the controller 310 uses alteration-rules 730, illustrated in FIG. 10, to analyze the personal data 60.

As shown in FIG. 10, in alteration-rule ALT900, the controller 310 analyzes the personal data 60 and recognizes that the subscriber is generally at the office between 8:00 am and 6:00 pm on weekdays. Therefore, the "condition", i.e., "IF (AT LOCATION)" is met. The controller 310 then performs the corresponding action of accessing the service data 70 to determine if there is a terminal at the location. Subsequently, in rule ALT910, if the controller 310 determines that there is a terminal, then the controller 310 designs a service schedule in an alternative service data 75 in which calls received at other terminals should be routed to the terminal at the subscriber's designated location indicated in the personal schedule of personal data 60. An example of this alternative service schedule is shown in FIG. 9. In this way, the controller 310 identifies and eliminates inconsistencies in the service data 70.

FIG. 9 illustrates an alternative service schedule contained in the alternative service data 75. During week days, the subscriber has all telephone calls received by the home telephone between 8:00 am and 5:00 pm routed to the office after two rings. Between 5:00 and 7:00 pm all telephone calls received by the home and office telephones are routed to the cellular telephone after two rings. After 7:00 pm, all calls received by the office and cellular telephones are routed to the home after two rings. The subscriber requests that all telephone calls received at the office switch to voice mail after three rings. At home, the telephone calls switch to voice mail after five rings. Telephone calls to the cellular phone switch to voice mail after four rings.

Because call routing is initiated before a calling party may leave voice mail, the call forwarding and voice mail work together so that an incoming call is routed through the listed possible destinations prior to a calling party leaving voice mail at the telephone number where the call was originally routed.

It should be clear that the alternative service schedule 75 of FIG. 9 is more compatible with the subscriber's personal schedule 61 shown in FIG. 6 then the service schedule 70 shown in FIG. 8. Using the service optimizer 300, the service schedule contained in the service data may be altered to improve efficiency.

As another illustrative example of the potential improvement in efficiency, the subscriber personal schedule 61 illustrated in FIG. 6 indicates that the subscriber attends a weekly staff meeting away from the office between 8:00 and 10:00 am on Wednesdays. As discussed above, with the improved service schedule illustrated in FIG. 9, calls are routed from the subscriber's home to the office between 8:00 am and 6:00 pm on weekdays.

Following access of the personal data 60, the controller 310 uses alteration-rules 730 to analyze the personal data 60. As shown in FIG. 10, using alteration-rule ALT1000, the controller 310 analyzes the personal data 60 and recognizes that the subscriber is out of the office between 9:00 and 11:00 am on Wednesdays. Therefore, the "condition", i.e., "IF (REGULARLY AWAY FROM OFFICE)" is met. The controller 310 then performs the corresponding action of accessing the service data 70 to determine if there is a cellular phone or paging service used by the subscriber. Subsequently, in rule ALT1010, if the controller 310 determines that the subscriber has both a pager and a cellular phone, then the controller 310 accesses the personal data 60 to determine if the subscriber has a preference between being paged or having a telephone call routed to the cellular phone. In rule ALT1020, if the subscriber has a preference between paging and a cellular phone call, the controller designs the service schedule of the alternative service data 75 to perform call routing to the subscriber's preferred terminal between 9:00 and 11:00 am on Wednesdays.

Additionally, if the subscriber has included a preference about the priority of receiving office phone calls and home telephone calls routed to the office, the controller 310 may use alteration-rules 730 for determining the most efficient way to route these two types of phone calls in accordance with the subscriber's instructions. For instance, if the subscriber has indicated in the personal data 60 that receiving calls at the office that are routed from the home telephone to the office is less important then receiving routed office telephone calls, the controller 310 can analyze the service data 70 using condition-action rules to determine if the routed home telephone calls can be left on voice-mail at the office rather then re-routed to the subscriber's cellular telephone. Thereby, the subscriber would not be interrupted in the staff meeting by telephone calls routed from the home phone number.

Figure 11:
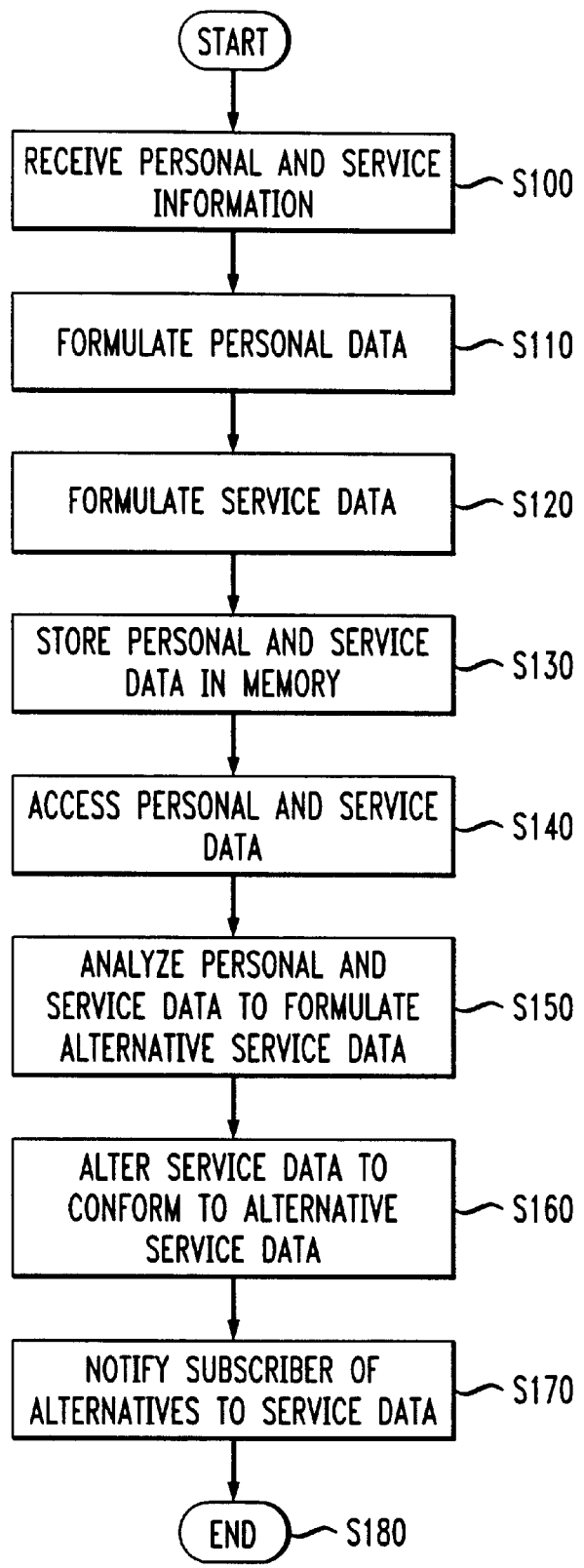
FIG. 11 is a flow chart illustrating a method according to the first embodiment.

FIG. 11 is a flow chart illustrating a method for improving the subscriber's efficiency using the service optimizer 300 of the first embodiment. The method is started when a subscriber initially subscribes to the communication service or is updating the information in the subscriber profile 50. In step S100, the controller 310 receives the subscriber's personal information and information relating to the services requested by the subscriber and goes to step S110. The controller 310 receives the information from a terminal 200 attached to the network 100 or directly from the input/output interface 340 in the service optimizer 300. In step S110, the controller 310 organizes the subscriber's personal information into subscriber personal data 60 and goes to step S120. Alternatively, subscriber personal data 60 may be directly input into the memory 330 through the network 100 or the input/output interface 340 if the personal data was previously prepared using another processor to be downloaded quickly to the memory 330 of the service optimizer 300.

In step S120, the controller 310 organizes the data related to the subscriber's requested services into subscriber service data 70 and goes to step S130. Alternatively, the subscriber service data 70 may be directly input into the memory 330 through the network 100 or the input/output interface 340.

In step S130, the controller 310 stores the subscriber's personal data 60 and service data 70 as a subscriber profile 50 in a database established in the memory 330 and goes to step S140. In step S140, the controller 310 accesses the subscriber profile 50 stored in the memory 330 and goes to step S150. In step S150, the controller 310 then analyzes the subscriber profile 50 using the alteration-rules 730 (e.g., ALT1000, 1010 and 1020) to formulate alternative subscriber service data 75 and moves to step S160. The alternative service data 75, may be, for example, the alternative service schedule shown in FIG. 9. In step S160, the controller 310 automatically alters the subscriber service data 70 to be identical to the alternative service data 75 and goes to step S170. In step S170, the controller 310 notifies the subscriber that the subscriber service data 70 has been altered and explains the new service data and goes to step S180 and ends.

As a further example of the application of the service optimizer 300, the personal schedule 61 in the personal data 60 illustrated in FIG. 6 indicates that the subscriber regularly plays golf on Saturday mornings between the hours of 7:00 am and 12:00 pm. The subscriber may have inputted this information into the personal data 60 when he was subscribing to the communication services or as the subscriber profile 50 was updated. The controller 310 analyzes the subscriber's personal data 60 and recognizes that the subscriber will not be reachable at a home telephone on Saturday mornings between 7:00 am and 12:00 pm. The controller 310 then analyzes the service data 70 and identifies that the subscriber has not requested that calls at home be routed to a cellular telephone. The controller 310 then formulates an alternative service schedule in the alternative service data 75 instructing that calls be routed from the home telephone to a cellular telephone on Saturday mornings between the hours of 7:00 am and 12:00 pm after three rings. The controller 310 then conforms the service data 70 to the alternative service data 75. As a result, a received call to the subscriber may be completed when the subscriber is golfing by routing the call to the cellular telephone.

In a second embodiment, the service optimizer 300 alters the service data 70 based on data indicative of the subscriber's previous use of the service system 1000 stored in a subscriber profile 50.

The subscriber use data 80 indicates the subscriber's previous use of the subscribed to services. As illustrated in FIG. 2, the subscriber profile 50 includes use data 80 indicating how the subscriber has actually used the services in the past. FIG. 12 shows a portion of subscriber use data 80 related to the above example. The use data 80 illustrated in FIG. 12 is merely illustrative of the present example; therefore, the use data 80 may include other types of information besides the exemplary information illustrated therein. As shown in FIG. 12, the subscriber use data 80 may indicate that the subscriber does not answer calls at the subscriber's home between 7:00 and 9:00 pm 80% of the time. The use data 80 may also indicate that the subscriber retrieves voice-mail messages between the hours of 7:00 pm and 9:00 pm using the cellular phone 70% of the time. Because a subscriber's previous use of services may be indicative of the subscriber's future use, the service optimizer 310 is able to identify deficiencies in a subscriber's use of the service system by analyzing the subscriber use data 80 and is able to formulate alternative service data 75 based on the subscriber use data 80.

As the subscriber uses the services of the service system 2000, the controller 310 provides the requested service as well as records transactional data 40, shown in FIG. 13, in the memory 330. The transactional data 40 indicates how the services are performed. Subsequently, the controller 310 analyzes the transactional data 40 to formulate the use data 80 of the subscriber profile 50.

FIG. 13 shows an example of transactional data 40. Every time a call is made to the subscriber's office, home and cellular telephones, the controller 310 records how many rings sound before the subscriber answers, whether the subscriber answers, what time the calls are received, etc. Additionally, the controller 310 records information about how the subscriber interacts with the service system 2000. For example, as shown in calls 001113 and 001116, the controller 310 records the automatic name identification (ANI) of the terminal from which the subscriber checks voice-mail. After a set period of time (for example, a 24 hour period) use data 80 is formulated by the controller 310 including, for example, the percentages of calls completed to calls received, the number of rings and routings necessary for call completion, and the ANI of terminals used to access voice-mail. The controller 310 stores the use data 80 in the subscriber profile 50.

The controller 310 then analyzes the use data 80 to determine if the service data may be altered using alteration-rules to improve efficiency in the system. Examples of alteration-rules 730 used in analyzing use data 80 are shown in FIG. 10. These alteration-rules 730 are used by the controller 310 to determine whether the use data 80 indicates that alterations to the subscriber's service data 70 are necessary to maximize the likelihood of call completion without unnecessary hold times for the caller.

Using alteration-rules such as ALT2000, the controller 310 analyzes the use data 80 to determine what alterations are necessary. For example, in ALT2000, if more then 95% of the calls received by the telephone number are answered, then no alteration to a routing service is necessary. ALT2010-ALT2030 are examples of call routing alteration-rules. Using ALT2010, the controller 310 determines if the number of calls completed, e.g., answered, in two rings over a period of time at a telephone is less than 90% of the number of calls received by the telephone. If the percentage is less than 90%, the controller uses ALT2020 to determine if 90% of the received calls are answered in three rings. ALT2030 determines if 90% of the received calls are answered in four rings. If this is not the case, the controller 310 accesses the personal data 60 to determine if there is another telephone number that may receive routed telephone calls.

Another one of the alteration-rules 730 may state that analyzing user data 80 is not useful in improving a subscriber's efficiency if the use data 80 indicates that no recognizable pattern of activity exists. An example of such an alteration-rule would be ALT2040 shown in FIG. 10, where the percentage data would be the percentages indicating patterns from the transactional data 40 stored in memory 330.

The controller 310 also analyzes the personal data 60 and service data 70 to formulate alternative service data 75 to provide the most efficient service to the subscriber. The controller 310 automatically alters the subscriber service data 70 stored in the database of the memory 330 to be identical to the alternative service data 75 and notifies the subscriber that the service set up in the service data 70 has been altered.

Figure 14:
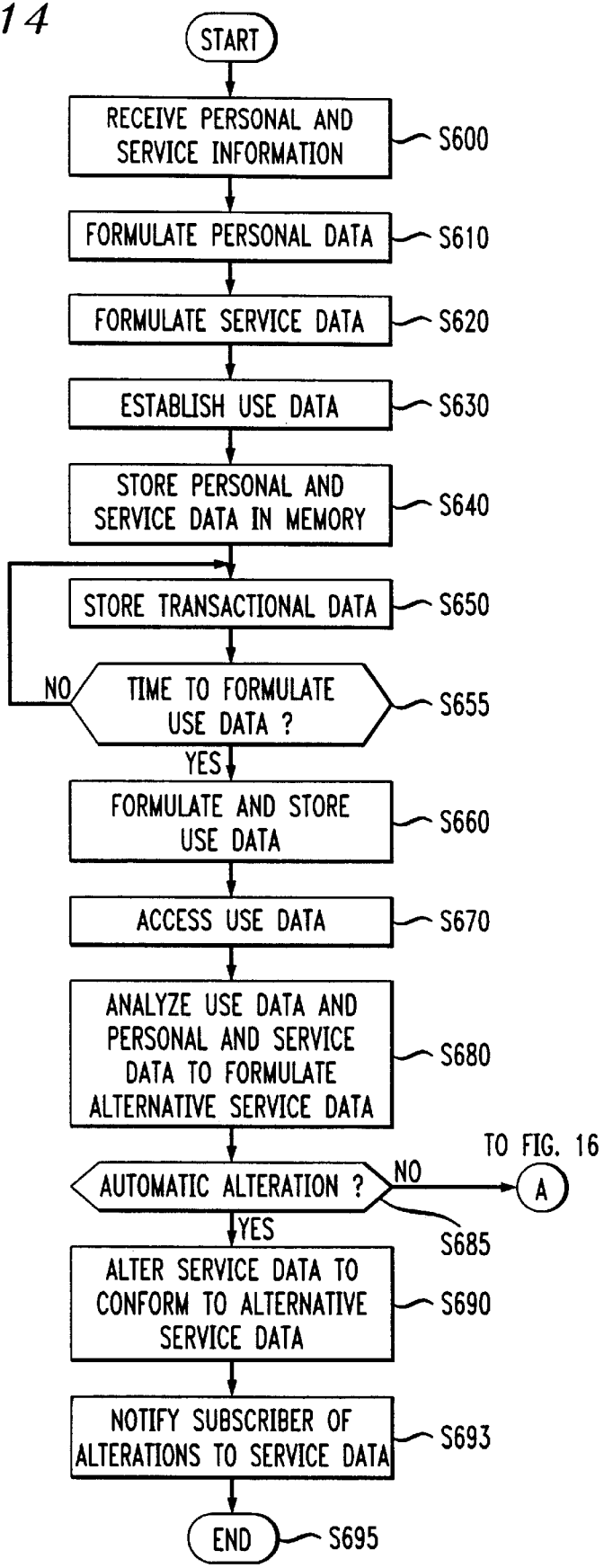
FIG. 14 is a flow chart illustrating a method according to a second embodiment.

FIG. 14 is a flow chart illustrating a method of using the service optimizer 300 of the second embodiment. In step S600, controller 310 receives the subscriber's personal information and information relating to the services requested by the subscriber goes to step S610. The controller 310 may receive the information through the network interface 320 or through the input/output interface 340. In step S610, the controller 310 organizes the subscriber's personal information into subscriber personal data 60 and goes to step S620. In step S620, the controller 310 organizes the information related to the subscriber's requested services into subscriber service data 70 and goes to step S630.

In step S630, the controller 310 establishes a section of memory 330 for the subscriber use data 80, which contains a section for analyzed transactional data 40, and goes to step S640. In step S640, the controller 310 stores the subscriber personal data 60 and the subscriber service data 70 in the subscriber profile 50 in a database established in the memory 330 and goes to step S650.

In step S650, the controller 310 stores data indicative of how the subscriber uses the services provided by the communication system 2000 in the transactional data 40 and goes to step S655. In step S655, the controller determines whether it is time to formulate use data 40 from the transactional data stored during step S650. The controller 310 accesses the personal data to determine the length of the finite period of time over which the controller should analyze the transactional data 40 to produce the use data 80. In step S655, if the controller determines it is not time to formulate the use data 80, the controller 310 returns to step S650; otherwise, the controller 310 goes to step S660. In step S660, the controller 310 formulates subscriber use data 80 by analyzing the transactional data 40 stored in the memory 330 to identify patterns of use by determining percentages, as discussed above, stores the subscriber use data in subscriber profile 50 and goes to step S670. In step S670, the controller 310 accesses the subscriber use data 80 stored in the memory 330 and goes to step S680.

Figure 16:
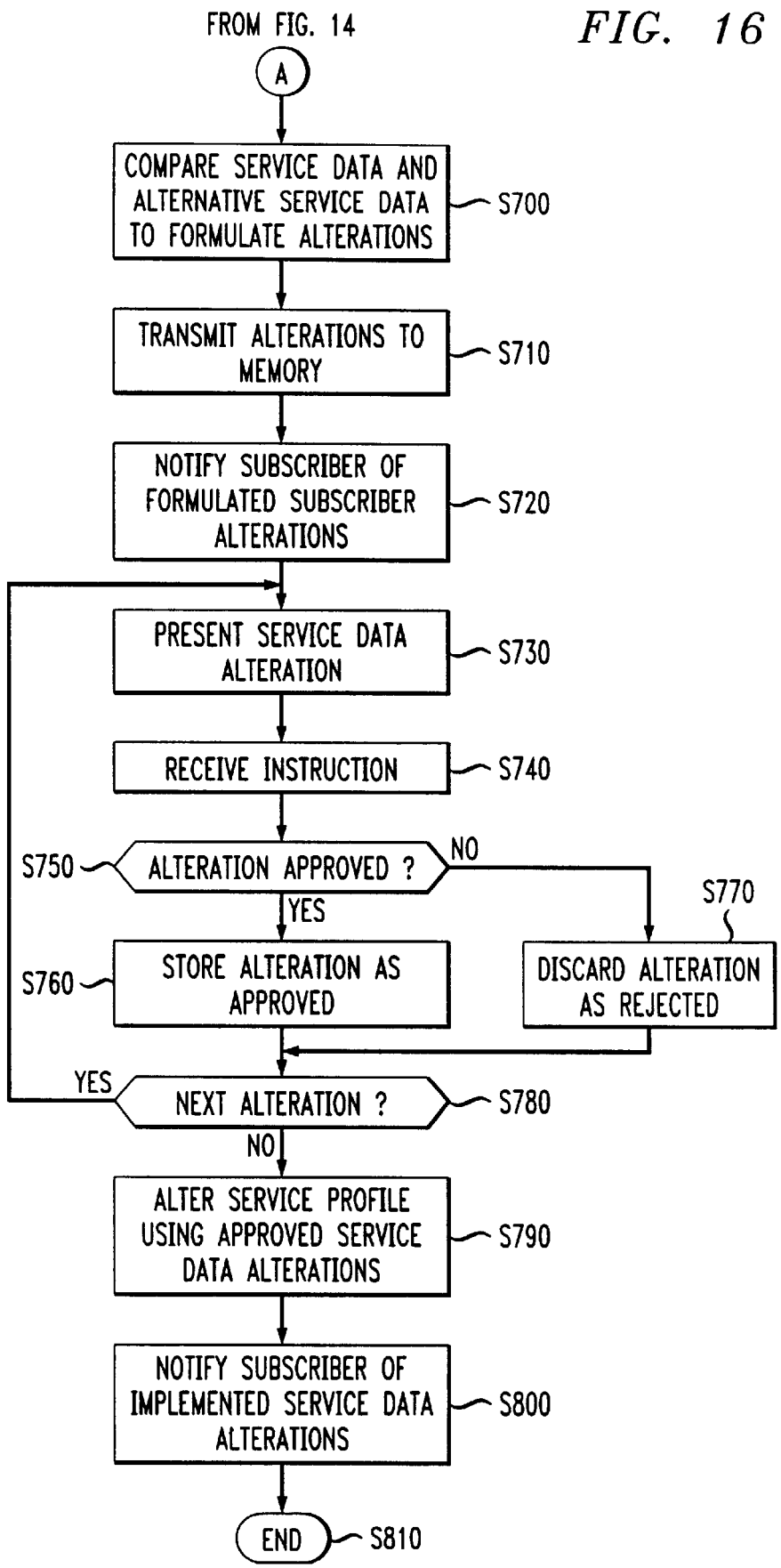
FIG. 16 illustrates a flow chart illustrating a method according to the third embodiment.

In step S680, the controller 310 analyzes the subscriber use data 80 using the alteration-rules 730 to formulate an alternative subscriber service data 75 and goes to step S685. The controller 310 will also analyze personal and service data to formulate the alternative subscriber service data 75. The duration of the finite period of time between step S650 and step S660 and the timing of steps S670 and S680 may be chosen so that the maximum amount of processor capabilities are available (e.g., early morning hours when projects being conducted are minimal). In step S685, the controller 310 accesses the personal data 60 to determine whether the subscriber has requested automatic implementation of alternative service data 75 or, alternatively, requested implementation of alternative service data only after approval by the subscriber. If the controller 310 determines that automatic implementation of alternative service data is preferred, the controller 310 goes to step S690; otherwise, the controller 310 goes to step S700 as shown in FIG. 16 and interacts with the subscriber to alter the subscriber service data 70 as a third embodiment.

In step S690, the controller 310 automatically alters the subscriber service data 70 to be identical to the alternative service data 75 and goes to step S693. The resulting service data 70 may, for example, allow incoming calls to be routed to a next destination, e.g., a pager, after 2 rings at the office, and 5 rings at home. This use of the service optimizer 300 would allow the subscriber to maximize the likelihood of call completion at home and the office without unnecessary hold times for the caller. In step S693, the controller 310 notifies a subscriber that the subscriber service data 70 has been altered and explains the new service data and goes to step S695 and ends. Using this method, the service optimizer 300 identifies inconsistencies between service data 70 and personal data 60 or use data 80 and optimizes the subscriber service data based on a subscriber's previous use of the service system.

The alterations to the service data 70 resulting from conforming the service data 70 to the alternative service data 75 may be limited to alterations in the way a subscriber is using the services subscribed to. An example of this type of alteration is illustrated in FIGS. 8 and 9, in which no new services were subscribed to but the routing of calls was altered to improve efficiency. If a subscriber wishes to limit alterations to manipulation of only those services already subscribed to, the preferences section of the personal data 60 may indicate such a limitation and the controller 310 may operate accordingly. Alternatively, a subscriber may wish for the alterations to encompass signing up the subscriber for services not previously subscribed to.

In a third embodiment of the invention, the service optimizer 300 queries the subscriber with prompts to confirm or reject alterations to the service data 70.

The controller 310 compares service data 70 and the alternative service data 75 and identifies differences between the service data 70 and alternative source data 75 as subscriber service alterations 73. The service optimizer 300 provides the service data alterations 73 to the subscriber through the terminal 200 via the network 100 as suggested alterations 73 for approval or rejection by the subscriber through the terminal 200. FIG. 15 illustrates an example of a suggested service data alteration 73. The service alteration 73 is based on analysis of the personal data 60, the service data 70 and the use data 80 in the same manner as the second embodiment; however, the third embodiment allows the subscriber to review alterations to the service data 70 prior to implementing the alterations 73.

Additionally, the service optimizer 300 is capable of receiving requests for service data alterations originating from a subscriber through the terminal 200. In this way, a subscriber is not limited to only responding to suggested service data alterations 73. The subscriber may initiate service data alterations 73 directly. In this way, the subscriber is able to enter information indicative of future use of the service. For example, if the subscriber is leaving home for an extended trip, the subscriber may enter this information for storage in the personal data 60 and suspend services until he returns from the trip by altering the service data 70. Alternatively, the subscriber could enter data indicating an extended vacation in the personal data 60 and control the service optimizer 300 to develop suggested alterations to the service data 70 to accommodate the activity.

As shown in FIG. 16, in step S700, the controller 310 compares the service data and the alternative service data 75 to determine specific differences between the data as service data alterations 73 and goes to step S710. In step S710 the controller 310 stores the service data alterations in the memory 330 and goes to step S720. In step S720, the controller 310 notifies the subscriber that service alterations 73 have been formulated and are available for the subscriber's review and approval and goes to step S730. The subscriber could be notified of suggested service alterations 73 through one of the terminals 200, e.g. a telephone or personal computer, when the subscriber next uses the communication system 2000. This notification also could be delivered using a web-based administrative system provided by the communication system 2000.

In step S730, the controller 310 presents a first service data alteration to the subscriber via the terminal 200 and goes to step S740. The controller 310 may also output an explanation message to help the subscriber understand the need for altering the subscriber service data 70. Instep S740, the controller 310 receives the subscriber's response and goes to step S750. In step S750, if the alteration is approved, the controller 310 goes to step S760; otherwise, the controller 310 goes to step S770. In step S760, the controller 310 stores the alteration in memory 330 and goes to step S780. In step S770, the controller 310 discards the alteration and goes to step S780. In step S780, the controller 310 determines whether any other service alterations 73 have not been reviewed. If additional alterations 73 must be reviewed by the subscriber, the controller 310 returns to step S730; otherwise the controller 310 goes to step S790. Instep S790, the controller 310 alters the subscriber service data 70 by implementing the approved service alterations 73 and goes to step S800. In step S800, the controller 310 notifies the subscriber that the approved alterations have been implemented and goes to step S81 and ends.

The service alterations 73 may be limited to alterations in the way a subscriber is using services to which he has previously subscribed. Alternatively, the alterations could encompass signing up the subscriber for services to which he has not previously subscribed.

Another benefit of the third embodiment is as follows. When a subscriber answers 99% of the phone calls at the office before the third ring, but answers 99% of the calls at the home before the fifth ring, the controller 310 may suggest a subscriber service alteration 73 that allows incoming calls to be routed to the next call forwarding number after 2 rings at the office, and 5 rings at home. The subscriber has the option of altering the subscriber service data 70 with the benefit of the controller's suggested alterations 73 but the subscriber retains control of when and how the subscriber service data 70 is altered.

As an example, the subscriber is considering using a pager; however, the subscriber has not determined if the pager works well with the subscriber's call forwarding set up and voice-mail. Assuming no subscriber restrictive limitations indicating that new services should not be suggested, the service optimizer 300 analyzes the subscriber's use data 80 and personal data 60 and consider how paging would improve the subscriber's use of the other services and improve the percentage of call completion without making a calling party wait an unacceptable amount of time. The service optimizer 300 may then recommend adding a paging service at specific times during the service schedule. For example, the service optimizer 300 may suggest using a paging service between 12:00 and 1:00 pm on weekdays, because, as shown in FIG. 6, the subscriber is running. The suggested service alteration would page the subscriber between those hours when an incoming call is received at the office or home. The service optimizer 300 could suggest a pager service, for example, wherein the caller has the option of: (1) paging the subscriber, (2) leaving priority voice mail by leaving voice mail and paging the subscriber with the ANI of the terminal originating the incoming call, or (3) placing the incoming call on hold and paging the subscriber with the ANI of the originating terminal to provide the opportunity for the subscriber to receive the telephone call on, for example, a cellular telephone. Following approval, the service optimizer 300 would alter the service profile to include such a paging service.

By allowing the service optimizer 300 to consider unlimited subscriber data alterations, a subscriber may receive suggestions about additional services such as, for example, call routing, page and connect, a caller's choice menu, variable routing on busy and no-answer conditions, page and redial, follow-me routing, etc. In this manner, the subscriber may benefit from other types of services without having to personally reformulate the service data.

In a fourth embodiment of the invention, the service optimizer 300 includes a security mechanism for assuring that only the subscriber may approve alterations to the subscriber service data 70. The security mechanism is included in the controller 310 and ensures that an individual may not alter a subscriber profile 50 unless there are indicia that the individual is the subscriber. For example, the controller 310 may require a text-based password input through a terminal 200. Alternatively, the service optimizer 300 may include a voice-to-text converter which converts a voice-spoken password into text to be interpreted by the service optimizer 300. The voice-to-text converter could also be located within the network 100 or in the terminals 200.

Alternatively, the security mechanism could utilize voiceprints. The security mechanism would then require frequency analyzing equipment necessary for analyzing a voiceprint. This frequency analysis equipment could also be located in the controller 310 or elsewhere within the system 1000.

The security mechanism could also make subscriber profile access contingent on the subscriber accessing the system 1000 from a specific terminal 200 by utilizing ANI (or caller ID). This type of security safeguard would use origin identifying information to identify the terminal 200 from which the subscriber is accessing the system 1000. Security safeguards using origin identifying data are less effective because someone other than the subscriber may have access to the terminal with the specific origin identifying data. Additionally, origin identifying data may be falsified or counterfeited by routing procedures within the network.

Figure 17:
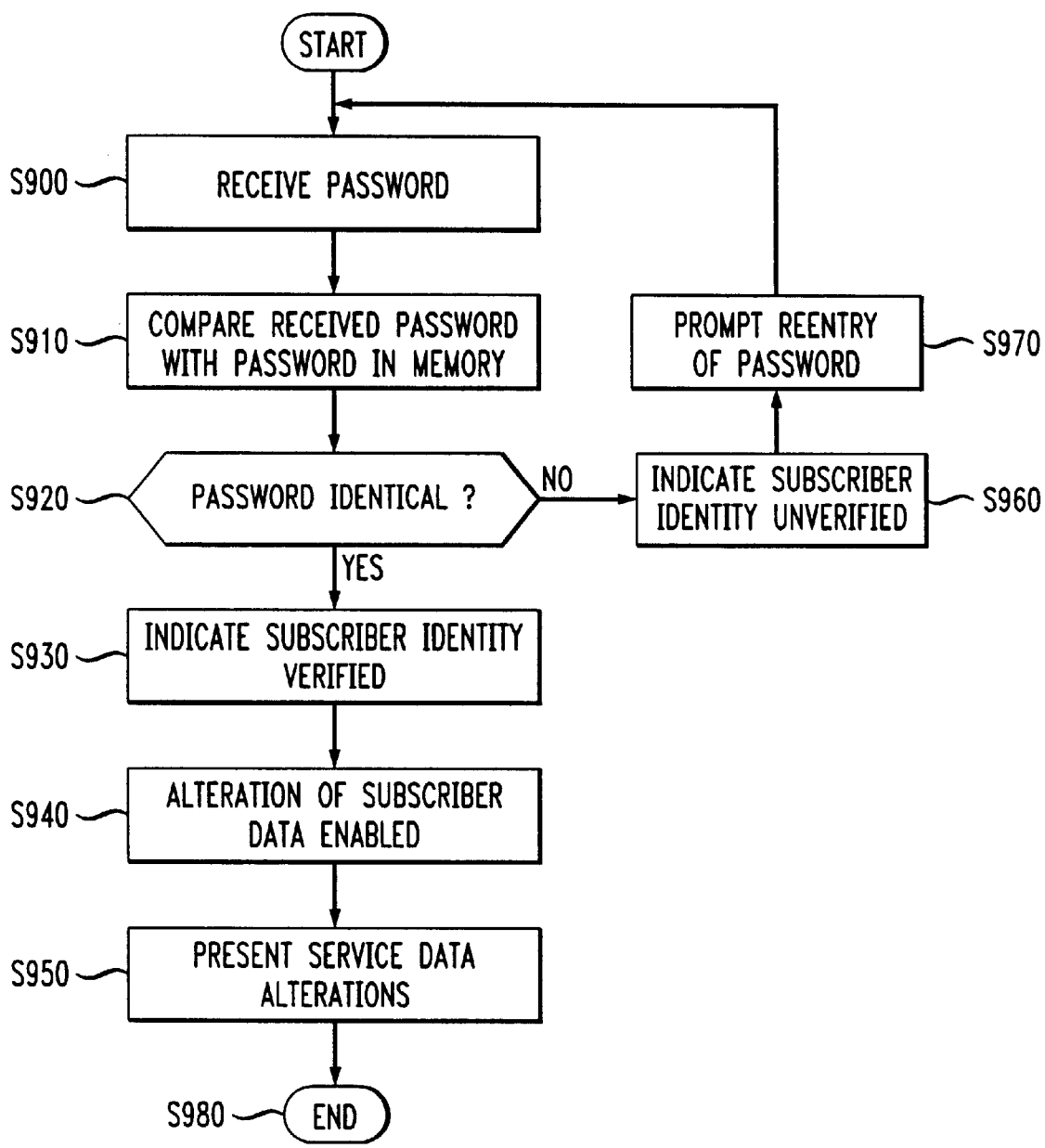
FIG. 17 is a flow chart illustrating a method according to a fourth embodiment.

FIG. 17 is a flow chart illustrating a method for safeguarding security according to the fourth embodiment of the invention. The security process begins when a request is received to alter a subscriber profile 50. In step S900, the controller 310 receives a password from the subscriber through the network 100 and goes to step S910. In step S910, the controller 310 compares the received password with a password stored in the subscriber personal data 60 stored in the memory 330 and goes to step S920. In step S920, the passwords are compared.

If the passwords are identical, the controller 310 goes to step S930 in which the controller 310 indicates that the subscriber's identity has been verified using terminal 200 and goes to step S940; otherwise, the controller 310 goes to step S960. In step S940, the controller 310 permits alteration of the subscriber profile 50 and goes to step S950. In step S950, the service data alterations 73 are presented to the subscriber via the terminal 200 and the controller goes to step S980 and ends the security process.

In step S960, the controller 310 determines that the subscriber's identity has not been verified and goes to step S970. In step S970, the controller 310 prompts the subscriber to reenter a password and the method returns to step S900. The controller 310 may perform steps S960, S970, and S900–S920 multiple times up to a preset limit. When the security mechanism uses a voice-print, a spoken password, an ANI, or a voice-mail number, the method illustrated in FIG. 17 is altered to include the necessary steps to analyze these security tools.

While this invention has been described in conjunction with specific embodiments thereof, it is evident that many alternatives, modifications, and variations will be apparent to those skilled in the art. The service optimizer may be used in conjunction with many different types of systems such as, for example, the above-mentioned information access system.

Many individuals use information access service systems for accessing information stored on networks such as, for instance, a local area network, a wide area network, an intranet or the Internet. These information access systems may offer the option of searching sets of databases for information. In order to search the sets of databases, the system may display numerous help screens and prompts on a computer terminal so that a subscriber may navigate through the various searching options. Once a search produces found information, the system may offer different types of additional information and different formats in which the found information is formatted.

A subscriber may consistently search the same set of databases, e.g., employee directories, and switch to a different set of databases, e.g. sales records or employment files, for additional information. Similarly, the subscriber may consistently request a specific format for information. However, unbeknownst to the subscriber, there is a way to search sales records and employment files in conjunction with employee directories; this way of searching provides the requested data more quickly with less unwanted data retrieved by a search. Additionally, there may be a way to set the subscriber's requested information format as a default format to further reduce the time required to access information. However, due to the complexity of the information access system, a subscriber may not understand the system well enough to take advantage of these ways of improving the subscriber's searching efficiency.

Using the service optimizer 300, a subscriber's use of services could be made to be more efficient based on analysis of personal, service and usage data stored and analyzed by the service optimizer. The service optimizer may be centrally located within a network or may be distributed within a network. The terminals could be any type of input/output terminal such as, for example, personal computers or telephone stations.

The memory 330 may be part of the service optimizer 300 or may be located away from the service optimizer. Moreover, the memory containing the subscriber profiles 50 may be separate from the memory containing the transactional data 40.

Accordingly, the examples and preferred embodiments as set forth herein are intended to be illustrative, not limiting. Various alterations may be made without departing from the spirit and scope of the invention.

What is claimed is:

1. A method for optimizing a use of one or more services for a subscriber, comprising:

analyzing subscriber's use of subscribed to services to identify one or more patterns in the subscriber's use;

generating a proposed new use of the one or more services based on the patterns;

evaluating the patterns based on optimizing parameters, wherein the evaluation step comprises: processing the one or more patterns using a set of alteration rules to identify an inconsistency between the subscriber's use and the services; and generating one or more alterations of the subscriber's use based on the identified inconsistency, wherein the subscriber's use is altered by applying one or more alterations to generate the proposed new use based on the evaluation results.

2. The method of claim 1, further comprising:

automatically implementing the proposed new use of the one or more services; and notifying the subscriber of the implementation.

3. The method of claim 1, further comprising:

presenting the proposed new use of the one or more services as a suggestion;

prompting the subscriber to accept the suggestion; and performing the accepted suggestion.

4. The method of claim 3, wherein the prompting step comprises communicating the suggestion to the subscriber using a network.

5. The method of claim 1, further comprising:

monitoring the subscriber's use to generate transactional data, wherein the transactional data is processed to identify the one or more patterns of the subscriber's use.

6. The method of claim 1, wherein the services are one of telecommunications services and information access services.

7. The method of claim 1, further comprising ensuring an identity of the subscriber by verifying one of:

a text-based password, a spoken password, an input voice print, and an automated name identification of a terminal.

8. The method of claim 1, wherein the one or more alterations include one or more services not subscribed to by the subscriber.

9. A device that optimizes a use of one or more services for a subscriber, comprising;

a memory; and a controller coupled to the memory, the controller analyzing subscriber's use of subscribed to services to identify one or more patterns in the subscriber's use, and generating a proposed new use of the one or more services on the analysis result; wherein the patterns are evaluated based on optimizing parameters, wherein the controller processes the one or more patterns using a set of alteration rules to identify an inconsistency between the subscriber's use and the services, and generates one or more alterations of the subscriber's use based on the identified inconsistency, wherein the subscriber's use is altered by applying the one or more alterations to generate the proposed new use.

10. The device of claim 9, wherein the controller implements the proposed new use of the one or more services automatically and notifies the subscriber of the implementation.

11. The device of claim 9, wherein the controller:

presents the proposed new use of the one or more services as a suggestion;

prompts the subscriber to accept the suggestion prior to implementing the suggestion; and performs the accepted suggestion.

12. The device of claim 11, wherein the controller:

monitors the subscriber's use to generate transactional data, wherein the transactional data is processed to identify the one or more patterns of the subscriber's use.

13. The device of claim 11, wherein the controller prompts the subscriber to accept the suggestion by communicating the suggestion to the subscriber using a network coupled to the controller.

14. The device of claim 9, wherein the services are one of telecommunications services and information access services.

15. The device of claim 9, further comprising an input/output interface coupled to the controller and the memory, said input/output interface providing external access to the memory.

16. The device of claim 9, further comprising a security mechanism coupled to the controller and the memory, said security mechanism securing the memory to ensure that the subscriber's use of the subscribed to services is altered only by the subscriber.

17. The device of claim 16, wherein the security mechanism verifies one of a text-based password, a spoken password, an input voice print and an automated name identification of a terminal.

18. The device of claim 9, wherein the one or more alterations include one or more services not subscribed to by the subscriber.

* * * * *